US007765156B2

(12) United States Patent
Staniar et al.

(10) Patent No.: US 7,765,156 B2
(45) Date of Patent: Jul. 27, 2010

(54) METHOD AND APPARATUS FOR AUTOMATICALLY PROCESSING INVOICED PAYMENTS WITH SELECTABLE PAYMENT TERMS

(75) Inventors: Jud C. Staniar, New York, NY (US); Kimberley A. Maxie, Phoenix, AZ (US); Kristen A. Tsarnas, Ridgewood, NJ (US); Marissa D. Aiken, Marlboro, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1581 days.

(21) Appl. No.: 10/750,030

(22) Filed: Dec. 31, 2003

(65) Prior Publication Data

US 2005/0144130 A1 Jun. 30, 2005

(51) Int. Cl.
*G06Q 40/00* (2006.01)
(52) U.S. Cl. .......................................... 705/40; 705/35
(58) Field of Classification Search .................. 705/1, 705/40, 26, 42, 38, 64, 37, 75, 14, 16, 39, 705/44; 235/492, 376, 487, 380; 455/406, 455/414, 466
See application file for complete search history.

(56) References Cited

U.S. PATENT DOCUMENTS 6,167,385 A * 12/2000 Hartley-Urquhart .......... 705/35

| 2003/0033216 | A1* | 2/2003 | Benshemesh | 705/26 |
| 2005/0027654 | A1* | 2/2005 | Adrian | 705/40 |
| 2005/0144125 | A1* | 6/2005 | Erbey et al. | 705/40 |
| 2007/0055582 | A1* | 3/2007 | Hahn-Carlson | 705/27 |

OTHER PUBLICATIONS

Practice Management—Make Time for Time and Billing—BytePro Corp.: Time & Profit Bellone, Robert H—Accounting Technology; Oct. 1996; 12, 9; ABI/INFORM Global p. 23.*

* cited by examiner

*Primary Examiner*—James P Trammell
*Assistant Examiner*—John H Holly
(74) *Attorney, Agent, or Firm*—Snell & Wilmer L.L.P.

(57) ABSTRACT

An automated procurement, invoicing and payment processing system includes a payment financing model that particularly accommodates large purchase amounts using a credit account. A seller presents an electronic invoice to a buyer and selects its preferred payment terms. Upon the buyer's acceptance of the invoice, the buyer's credit account is charged for the invoiced amount. The seller is paid by the financial institution maintaining the buyer's credit account, according to the preferred payment terms selected by the seller. The seller is charged a transaction fee and a risk intermediation rate, as well as a reduced financing rate that is dependent upon the selected payment terms. The system further allows a seller to change its preferred payment terms during the period in which the invoiced amount is financed.

22 Claims, 2 Drawing Sheets

METHOD AND APPARATUS FOR AUTOMATICALLY PROCESSING INVOICED PAYMENTS WITH SELECTABLE PAYMENT TERMS

FIELD OF THE INVENTION

This invention generally relates to automated electrical financial systems, and in particular it relates to invoice distribution and payment.

BACKGROUND OF THE INVENTION

Financial services corporations, and in particular, those offering credit accounts for making purchases, are constantly competing to attract new customers, as well as endeavoring to increase the opportunities for existing customers to make purchases using their credit accounts. Oftentimes, a financial services corporation adopts new hardware and telecommunication innovations to their services and products in an effort to increase its customer base or the amount of transactions they undertake. However, such innovations alone have constantly failed to increase uptake in certain market segments.

For example, most credit transactions up to the present day, whether undertaken by a corporation or an individual consumer, tend to fall within the same general range of transaction amounts. That is, there are relatively few high-dollar transactions in the present marketplace, even among corporations that have magnitudes greater purchasing power than the average consumer. It has become readily apparent that the low uptake in this market segment, among others, can not cured by simply speeding up or streamlining the quality of traditional financial services.

Recognizing the superiority of average corporate purchasing power, there have been several previous attempts to attract corporations in particular to adopt credit accounts by instead changing the traditional structure of a credit account without significant change to technology infrastructure. For example, offerings such as the P-CARD program offered by VISA can accommodate corporate accounting by assigning individual spending limits to the business credit card accounts of various employees of a corporation, and then tying all the individual accounts to one corporate credit account to which payment may be made. Other financial institutions offer single-use account identifiers for corporate accounts, or other security features, in an attempt to generate more corporate use of their services. Most such prior attempts, though, have still failed to capture a significant portion of a corporation's "high-dollar spend."

Accordingly, there exists a need for a new payment processing system that addresses certain deficiencies in existing solutions.

SUMMARY OF THE INVENTION

The present disclosure, therefore, introduces various methods for processing a payment from a financial account, and apparatus for performing the same, forming a system in which high-dollar corporate purchasing transactions are readily accommodated. According to various embodiments of the payment processing system described herein, a buyer (such as a corporation, an employee, or other entity) may electronically place an order with a supplier, for which the buyer intends to pay from its credit account maintained by a financial institution. The supplier, in turn, may electronically generate and transmit back to the buyer an invoice corresponding to the order. The invoice may identify a payment term, such as a date by which the financial institution must settle the invoice, which is selectable by the supplier. In certain embodiments, the financial institution may require that the payment term must be within the range of three days to thirty days from the date of a buyer's approval of an invoice.

The buyer may automatically generate such an approval upon confirmation of the validity of the invoice, and electronically transmit its approval to the financial institution to pay the invoice from the buyer's credit account. The payment term is also transmitted to the financial institution, preferably with the approval.

Upon receiving the approval, the financial institution automatically charges the invoiced amount to the buyer's credit account. The buyer may later settle the credit account in any manner that is in accordance with the terms of its agreement with the financial institution. The financial institution then uses the selected payment term to calculate the payment due to the supplier for the invoice and the payment due date. Instead of being calculated using the traditional discount rate that is employed in most current credit transaction systems, the payment due is instead calculated in the following manner.

First, a flat transaction fee is assessed. The flat transaction fee is typically applied to all transactions using the presently disclosed system and is independent of the actual invoiced amount. For example, the flat transaction fee may be $10.00 per transaction.

Next, a "risk intermediation" fee is assessed. The risk intermediation fee is calculated as a percentage of the invoiced amount, and is preferably less than the common discount rates charged in present credit transactions. This same percentage is applied to all transactions using the presently disclosed system and, in some embodiments, does not vary with the actual invoiced amount. For example, the risk intermediation fee may be ten basis points of the invoiced amount.

Finally, a "financing" fee is assessed. The financing fee is calculated as a second percentage of the invoiced amount, again preferably less than traditional discount rates. The second percentage is also greater than the first percentage, and the percentage employed varies based on a length of the payment term selected by the supplier. For example, if the selected payment term is three days from approval, the financing rate may be eighty basis points of the invoiced amount. If the selected payment term is instead fifteen days from approval, the financing rate may instead be forty basis points. If the selected payment terms is thirty days, then the financing fee may not be assessed.

The flat transaction fee, the risk intermediation fee and the financing fee are each subtracted from the invoiced amount in order to calculate the payment due to the supplier to settle the invoice. Such payment may be transmitted by electronic finds transfer or the like on the selected payment due date. However, in further embodiments of the present disclosure, the supplier may, before the end of the selected payment term, submit a new payment term to replace the original payment term. The payment due may then be re-calculated by the financial institution when the change in payment term affects a change in the financing rate due. The re-calculated payment is then scheduled for the new payment due date and the original scheduled payment is canceled. Such change in payment terms does not affect the processing of the credit transaction with respect to the buyer.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF THE SPECIFIC EMBODIMENTS

Figure 1:
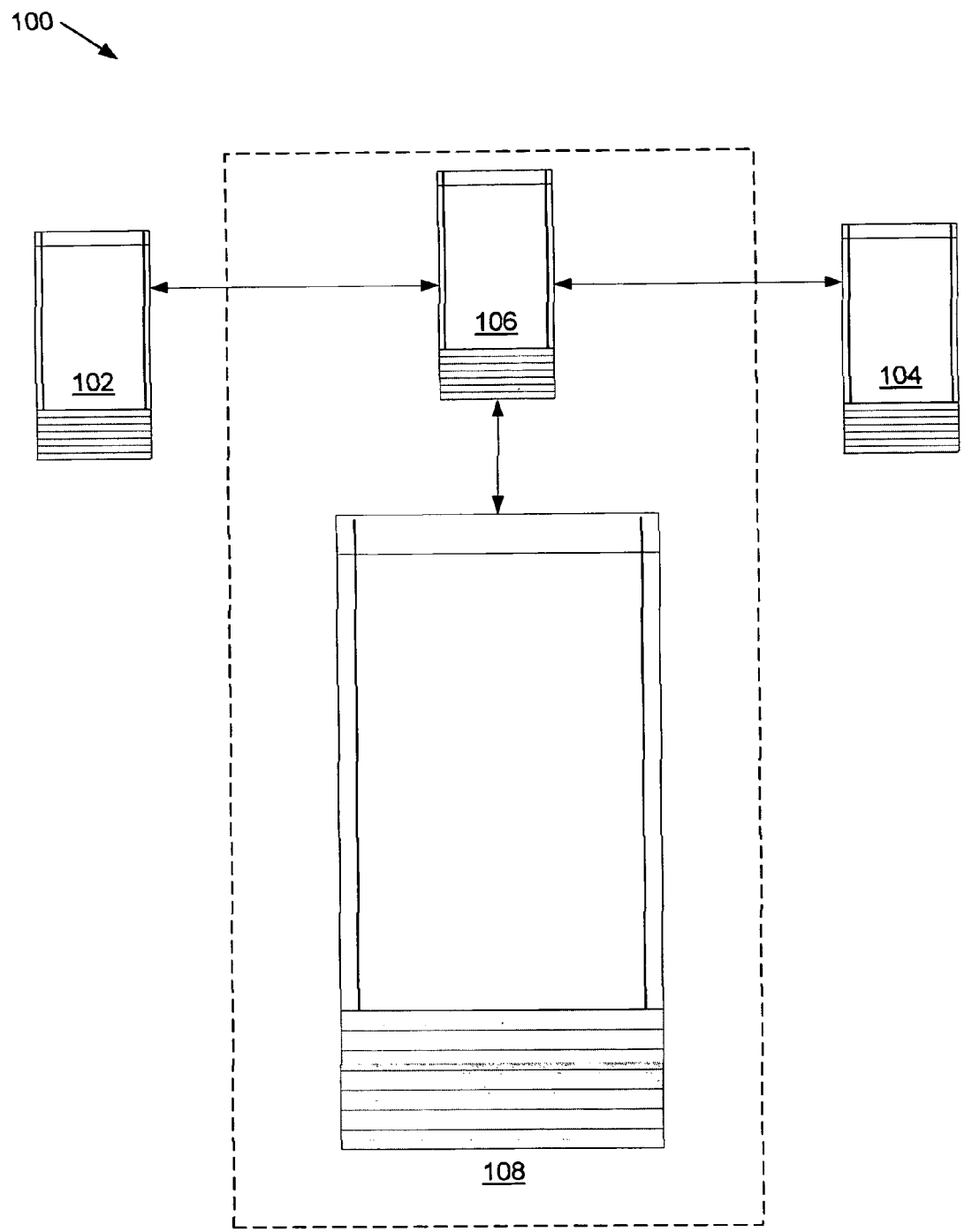
FIG. 1 is a schematic diagram of an exemplary financial communications network.
Figure 2:
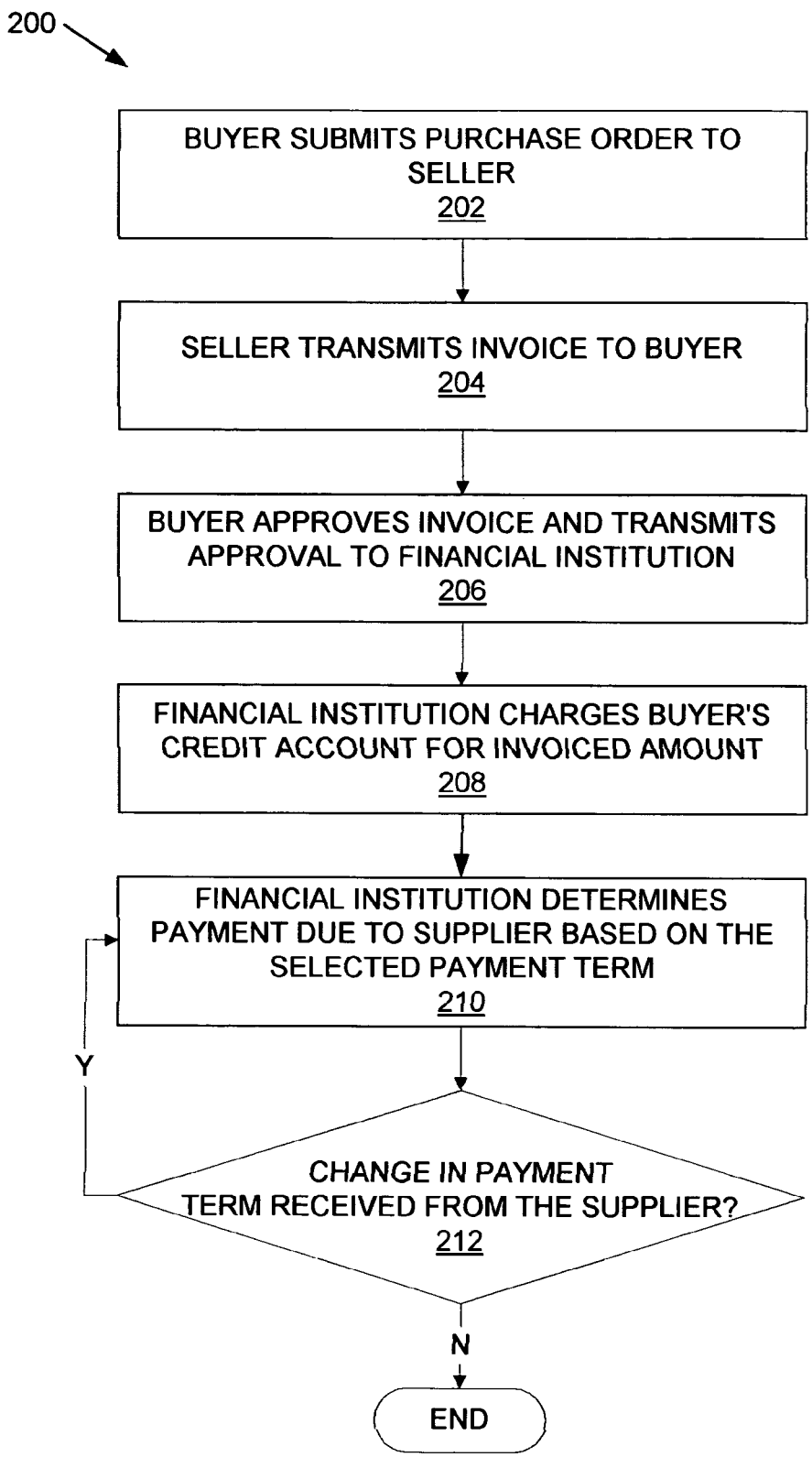
FIG. 2 is a flowchart depicting an exemplary payment processing method performed over the network of FIG. 1.

Referring now to FIGS. 1-2, wherein similar components of the present disclosure are referenced in like manner, various embodiments of a method and apparatus for automatically processing invoiced payments with selectable payment terms will now be presented.

There are three primary reasons why previous attempts to capture high-dollar corporate spend have been unsuccessful. First, the traditional discount rate (generally 1.8%-2.5%) charged to suppliers in standard credit transactions discourages vendors from accepting transactions involving higher dollar amounts because of the increasing revenue lost to paying the discount rate. Second, the inability of previous credit transaction systems to provide payment upon approval of an invoice adds complexity to a buyer's accounting practices, thus discouraging buyer's from using credit accounts for large transaction amounts. Third, there is insufficient data provided in standard credit transactions to enable tailoring of payment terms to accommodate both buyers and sellers needs in high-dollar transactions.

IPAYABLES has recently introduced Electronic Invoice Presentment and Payment (EIPP) technology, including software that allows suppliers to communicate invoices and accompanying data electronic to buyers. This software captures various information that was not available in the standard electronic information provided with previous credit transactions, including the ability to track a future payment due date requested by the supplier. EIPP may then be used to address the third problem identified above. EIPP software also provides dispute functionality for resolving any discrepancies in a transaction that may be disputed by a buyer. Other useful software applications of similar functionality are available from ARIBA and XIGN.

AMERICAN EXPRESS has recently introduced various corporate purchasing card (CPC) programs that allow buyers to automatically receive, validate and approve and pay invoices presented through the EIPP system. Such a CPC program may then be used to address the second problem identified above.

However, there have been no satisfactory solutions presented to address the first problem above associated with the traditional discount rate. It would therefore be advantageous to integrate the CPC and EIPP functionalities with a more attractive pricing model so as to adequately address all three problems identified previously. In particular, it would be advantageous to replace the traditional discount rate with a pricing structure that is more palatable to sellers and which adequately ensures continued profitability with mitigated risk to any financial institution offering the new pricing structure.

Accordingly, a new pricing structure is proposed herein in which the discount rate is replaced with a new fee structure including the following three components: (i) a flat transaction fee, (2) a risk intermediation charge that is calculated as a percentage of an invoiced amount, and (3) an optional financing charge that is calculated as a second percentage of the invoiced amount. The second percentage is variable and based on the payment term selected by the supplier in an electronic invoice. Generally, the earlier that payment is requested by the seller, the higher the second percentage will be. Each of these three fee components will be described in more detail later below.

The integration of CPC and EIPP technologies with this new pricing structure should attract more customers and encourage more high-dollar spends, thus increasing revenues for a financial institution that provides the integrated system. At the same time, the risks due to defaults and the like for the financial institution are mitigated through the variable nature of this pricing structure.

Since high-dollar transactions can impact the cash flow of a supplier that fulfills such an order, and since cash flow problems can appear without warning, it is readily contemplated that the integrated system disclosed herein allows a supplier to change payment terms after approval of an invoice in order to address its particular needs. For example, a supplier may choose to increase the payment term in order to lower the financing fee due, or may choose to decrease the payment term to receive a reduced payment earlier, as may be desired.

It is also readily contemplated that not all credit programs or credit card transactions may be subject to the new pricing structure. A financial institution may choose to limit the applicability to dollar amounts of a certain minimum value (for example, transactions that are greater than an average market-wide credit purchase). Additionally, a financial institution may offer the new pricing structure to customers that agree to a minimum value of annual transactions. Other criteria for qualifying for the new pricing structure may also be used.

Turning now to FIG. 1, there is depicted one example of a network 100 for accomplishing the functions described herein. The network 100 may include a buyer terminal 102, a seller terminal 104, a third party processor terminal 106, and a financial institution server 108. It is readily contemplated that the network 100 may be any type of network over which computer data and instructions may be transmitted, including but not limited to a local area network (LAN), a wide area network, a corporate intranet, a fiber optic network, a wireless network, the Internet, or any combination or interconnection of the same. The network 100 is also not necessarily restricted to the precise number of components, or their manner of interconnection, as shown in FIG. 1. The network 100 may include various effective and well-known security measures, such as encryption and secure transmission protocols, to securely communicate data among the various components of the network 100.

As described herein, the buyer terminal 102, the seller terminal 104, the third party processor terminal 106, and the financial institution server 108 are described as being single computing components. However, any one or more of these components of the network 100 may be a group of distributed computing components, such as a corporate LAN, rather than a single component as shown in FIG. 1.

The buyer terminal 102 may be any type of computing device or devices that can communicate with the remaining components over the network 100 in order to accomplish the functions described herein by the buyer. Accordingly, the buyer terminal 102 may be a personal computer, or the like, operated by a designated employee of a buyer.

Similarly, the seller terminal 104 may be any type of computing device or devices that can communicate with the remaining components over the network 100 in order to accomplish the functions described herein as performed by a seller (sometimes referred to herein as "supplier" or "merchant").

The third party processor terminal 106 may be any type of computing device or devices that can communicate with the remaining components over the network 100 in order to facilitate the EIPP functions described herein between the buyer and seller, and can transmit appropriate transaction and validation information from the buyer or supplier to the financial institution server 108, including invoices, approvals, and changes to payment terms. In certain embodiments, the third party processor terminal 108 may centrally host the EIPP functionality used by buyers and sellers. In other embodiments, it is readily contemplated that the third party processor terminal 106 is not required, and that its functions may instead be performed directly by the financial institution server 108.

The financial institution server 108 stores a plurality of databases (i.e in MICROSOFT SQL format) and programming instructions in any useful programming language, the execution of which, in conjunction with appropriate storage and retrieval of data from the stored databases, enables the performance of the various functions described herein as performed by a financial institution. The financial institution server 108 may accordingly be any type of computing device or devices, such as one or more enterprise network servers of the type commonly manufactured by IBM CORPORATION, that are scalable to accommodate the processing of transactions for even a global financial organization, as appropriate.

Referring now to FIG. 2, therein is depicted an exemplary process 200 for completing a credit transaction as performed by the various cooperative functions of the components of the network 100. The process 200 commences when a buyer submits a purchase order to a seller (step 202). The buyer may electronically communicate the purchase order using the buyer terminal 102 and transmit the same to the seller's terminal 104, either directly or via the third party processor terminal 106 over the network 100. The purchase order may be generated using buyer-side components of EIPP software or by other software applications of similar functionality, and may specify that a qualified credit account will be used to pay for the purchase order. It is readily contemplated that the invoice may be communicated in any standard manner and not limited to the particular examples described herein.

Upon receipt and acceptance of the purchase order, the seller, in turn, transmits an electronic invoice corresponding to purchase order to the buyer (step 204). The supplier may present invoices to the buyer electronically via the network 100 either directly or through the third party processor terminal 106. In addition to traditional invoice data, the supplier will select their payment term preference, which specifies a date by which the financial institution must provide actual payment for the invoice. In certain embodiments, the seller may be allowed to select a payment due date that is between three and thirty days (or one month) from the date of the buyer's approval of the invoice. In alternate embodiments, the supplier may select any due date within the permitted period, or must select among a set of discrete dates, such as three days, fifteen days or thirty days from the date of approval. The seller may also have default payment due dates that will be applied to an invoice unless it is replaced for a transaction or group of transactions. In any event, the payment made to the supplier by the financial institution will be determined based on the payment term selected, as described in detail later below.

Returning to the process 200, the buyer may approve the invoice received from the supplier using various reconciliation and validation functions that are typically provided in buyer-side components of the EIPP software or similar applications The buyer then transmits its approval to the financial institution server 108, ether directly or through the third party processor terminal 106 (step 206). It is contemplated that the approval of the invoice triggers the generation of a CPC authorization and settlement data file that is transmitted to the financial institution, which file includes standard credit transaction information, the supplier's payment preference, and any other appropriate data. The CPC authorization and settlement data file may be transmitted in an extensible markup language (XML) format and may be encrypted or otherwise securely transmitted to the financial institution server 108.

The financial institution, in turn, receives and validates the CPC authorization and settlement data file. The transaction data is extracted and stored in the financial transaction databases maintained by the financial institution server 108. The financial institution then charges the buyer's credit account for the amount due according to the invoice (step 208). The buyer's credit account may be settled with the financial institution at any time by the buyer, in accordance with standard terms of their credit account and independent of the payment terms received from the supplier.

Next, the financial institution calculates the payment due to the supplier and schedules a payment due date, each of which is based on the supplier's selected payment terms (step 210). According to the pricing structure introduced herein, the payment due to the supplier by the financial institution may be calculated as the amount due according to the invoice less a three-component fee subtracted by the financial institution, which is charged to the supplier in place of the traditional discount rate of previous credit transaction systems.

The three components of the fee charged to the supplier include a flat transaction fee, a risk intermediation fee, and an optional finance fee, the last of which is based on the payment terms selected by the supplier.

The flat transaction fee component is preferably a constant currency amount, such as $10.00 (for example), that is charged for all credit transactions that qualify for the new pricing structure. That is, the amount of the flat transaction fee may be independent of the invoiced amount. It is contemplated, however, that in some embodiments there may be separate transaction fees for increasing levels of transaction amounts or other categories of transactions.

The risk intermediation fee component is calculated as a first percentage of the invoiced amount that is preferably substantially lower than current discount rates. As one example, the first percentage may be ten basis points (or 0.1%) of the invoiced amount. The value of this first percentage may be independent of the invoiced amount. That is, this same percentage may be charged against all transactions that qualify for the new pricing structure. It is contemplated, however, that in certain embodiments, there may be increasing percentages assigned to increasing levels of transaction amounts.

The financing fee component is calculated as a second percentage of the invoiced amount. This second percentage may also be lower than current discount rates. However this second percentage may be higher than the first percentage charged, and the value of the second percentage may change based on the payment term selected by the supplier. In particular, the second percentage charged may increase as a selected payment term decreases, or the reverse.

As one example, the second percentage charged may be zero basis points (0% or $0.00) of the invoiced amount for a thirty day payment term, forty basis points (0.4%) of the invoiced amount for a fifteen-day payment term, and eighty basis points (0.8%) of the invoiced amount for a three-day payment term. The second percentage by be assessed on a sliding scale for each additional day of the selected payment term, or the percentage assessed may be at discrete levels based on a range in which the payment term falls (such as, zero basis points for a payment term of twenty-seven or greater, forty basis points for fifteen to twenty-six days, and eighty basis points for three to fourteen days). The supplier may also be required to select from among a set of discrete payment dates rather than selecting any date within an allowable range. Other similar ranges of payment dates and second percentage amounts than those described herein may be readily used.

It is contemplated that the three-component fee charged to the supplier may be presented as a single consolidated fee, and that the manner in which the fee is calculated is made known to suppliers so that they may anticipate fees to be charged and tailor the payment term of an invoice according to their needs.

Returning again to the process 200, one feature of the present disclosure is the ability of a supplier to change its payment terms, even after an approval of the invoice by the buyer. The financial institution server 108 may be programmed to continuously determine whether a change to the payment terms has been received from a supplier (step 212). If no changes are received before a selected payment due date, the payment may be provided on the requested payment date, after which the process 200 ends for this transaction. If, however, a supplier requests a new payment term, the process 200 returns to step 210 above where the financing rate may change based on the new payment term. Typically however, the flat transaction fee component and the risk intermediation fee component may not change based on the change to the payment terms.

In one example of the process 200 as contemplated, a corporation may place a $100,000 purchase order for computer equipment from a computer equipment supplier using the integrated payment processing system described herein. The supplier generates a purchase order with an invoiced amount of $100,000 and a payment term of thirty days. The buyer approves the invoice and the financial institution charges the $100,000 invoiced amount to the buyer's qualified credit account. The financial institution offers a pricing structure in which a $10.00 flat transaction fee and a ten basis point risk intermediation fee are assessed for all transactions. The pricing structure includes a financing rate of zero basis points for a payment term of twenty-seven or greater from a date of approval, forty basis points for fifteen to twenty-six days, and eighty basis points for three to fourteen days. The financial institution calculates a fee of $110.00 that includes $10.00 for the flat transaction fee, plus $100.00 for the risk intermediation fee (0.1% of the $100,000 invoiced amount), plus $0.00 for the financing rate (since the payment term is greater than twenty-six days). The financial institution schedules payment of $99,890 (the invoiced amount less the three component fee) to the supplier to be provided at thirty days from the approval date. At five days from the approval date, the supplier experiences a cash flow problem and requests a new payment term for the approved invoice at fifteen days from the approval date. The original payment is then cancelled by the financial institution, and the fee to be charged to the supplier is re-calculated. The financing fee changes from $0.00 to $400.00 (0.4% of the $100,000 invoiced amount based on the new payment term) while the previous flat transaction fee and risk intermediation components remain unchanged. Thus, the new fee to be charged to the supplier is $10.00 (flat transaction fee), plus $100.00 (risk intermediation fee), plus $400.00 (financing fee), for a total of $510.00. The new payment due of $99,490 (the invoiced amount minus the $510.00 fee) is then scheduled for payment at fifteen days from the approval date.

In further particular embodiments, it is contemplated that any of the three components of the fee charged to sellers may vary by merchant, or by groups of merchants (delineated by standard industrial codes, average annual transaction volume, credit-worthiness factors, financial status or any other useful category) in order to reflect the risks of doing business with such sellers, thereby maintaining flexibility and maximizing profitability of the disclosed system. The value of the three components may furthermore be continuously monitored and may be modified for a merchant or group of merchants at various times based on changing market conditions and merchant behavior.

This process 200 will enable a financial institution to gain incremental revenue from market segments not previously tapped. The opportunity for a financial institution is very large due to the anticipated significant increase in the number of transactions that would be performed under such a system, which would generally not be undertaken under present credit structures. The disclosed system is also beneficial to merchants who are relieved of previous discount rate charges. The streamlined procurement and accounting processes are likewise beneficial and attractive to customers of a financial institution that employs the disclosed system.

Although the best methodologies of the invention have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined first and foremost by the appended claims.

What is claimed is:

1. A method for processing a payment having a variable payment term from a financial account, comprising:
   receiving, at a processing device, from a buyer having a financial account, an identification of a seller's invoice including an invoiced amount and a first payment term;
   receiving, at the processing device, from the buyer, an approval to pay the seller's invoice using the financial account on a first date corresponding to the first payment term, wherein the first payment term has a corresponding first financing fee;
   receiving, at the processing device, from the seller, a request to receive payment on the invoice on a second date corresponding to a second payment term, wherein the second payment term is shorter than the first payment term;
   determining, at the processing device, a second financing fee based on the second payment term, wherein the second financing fee is greater than the first financing fee;
   providing, at the processing device, to the supplier, a payment for the invoice from the financial account on the second date, the payment corresponding to the second financing fee; and
   charging, at the processing device, the buyer the invoiced amount on the first date.

2. The method of claim 1, the financial account comprising a credit account.

3. The method of claim 2, the credit account comprising a corporate purchasing account.

4. The method of claim 1, wherein the first and second payment term each comprise a period from at least three days to at most one month from a date of the approval of the invoice.

5. The method of claim 1, wherein the first payment term is one of three days from a date of the approval of the invoice, fifteen days from the date of the approval of the invoice, and thirty days from the date of the approval of the invoice.

6. The method of claim 1, wherein the payment comprises an amount equal to the invoiced amount less (i) a flat transaction fee, (ii) a risk intermediation fee based on the invoiced amount, and (iii) the second financing fee.

7. The method of claim 6, the risk intermediation fee comprising ten basis points of the invoiced amount.

8. The method of claim 1, wherein the first and second financing fees are percentages of the invoiced amount, each percentage based on the corresponding payment term.

9. The method of claim 8, each percentage being between eighty basis points and zero basis points.

10. The method of claim 8, each percentage comprising one of: zero basis points for a thirty day payment term, forty basis points for a fifteen-day payment term, and eighty basis points for a three-day payment term.

11. The method of claim 6, the risk intermediation fee comprising a first percentage of the invoiced amount, the second financing fee comprising a second percentage of the invoiced amount, wherein the second percentage is greater than the first percentage.

12. A computer-program product comprising a computer readable storage medium having control logic stored therein for causing a computer to process a payment from a financial account, the control logic comprising:

first computer-readable program code to cause the computer to receive, from a buyer having a financial account, an identification of a seller's invoice including an invoiced amount and a first payment term;

second computer-readable program code to cause the computer to receive, from the buyer, an approval to pay the supplier's invoice using the financial account on a first date corresponding to the first payment term, wherein the first payment term has a corresponding first financing fee;

third computer-readable program code to cause the computer to receive, from the seller, a request to receive payment on the invoice on a second date corresponding to a second payment term, wherein the second payment term is shorter than the first payment term;

fourth computer-readable program code to cause the computer to determine a second financing fee based on the second payment term wherein the second financing fee is greater than the first financing fee;

fifth computer-readable program code to cause the computer to provide, to the supplier, a payment for the invoice from the financial account on the second date, the payment corresponding to the second financing fee; and sixth computer-readable program code to cause the computer to charge the buyer the invoiced amount on the first date.

13. The computer-program product of claim 12, wherein the financial account comprises a credit account.

14. The computer-program product of claim 13, wherein the credit account comprises a corporate purchasing account.

15. The computer-program product of claim 12, wherein the first and second payment terms each comprise a period from at least three days to at most one month from a date of the approval of the invoice.

16. The computer-program product of claim 12, wherein the first payment term is one of three days from a date of the approval of the invoice, fifteen days from the date of the approval of the invoice, and thirty days from the date of the approval of the invoice.

17. The computer-program product of claim 12, wherein the payment comprises an amount equal to the invoiced amount less (i) a flat transaction fee, (ii) a risk intermediation fee based on the invoiced amount, and (iii) the second financing fee.

18. The computer-program product of claim 17, wherein the risk intermediation fee comprises ten basis points of the invoiced amount.

19. The computer-program product of claim 12, wherein the first and second financing fees are percentages of the invoiced amount, each percentage based on the corresponding payment term.

20. The computer-program product of claim 19, wherein each percentage is between eighty basis points and zero basis points.

21. The computer-program product of claim 19, wherein each percentage comprises one of: zero basis points for a thirty day payment term, forty basis points for a fifteen-day payment term, and eighty basis points for a three-day payment term.

22. The computer-program product of claim 12, the risk intermediation fee comprising a first percentage of the invoiced amount, the second financing fee comprising a second percentage of the invoiced amount, wherein the second percentage is greater than the first percentage.

* * * * *